United States Patent
Kato et al.

(10) Patent No.: US 7,357,832 B2
(45) Date of Patent: Apr. 15, 2008

(54) WATER BASE PIGMENT INK FOR INK-JET RECORDING, INK CARTRIDGE ACCOMMODATING THE SAME, AND INK-JET RECORDING METHOD

(75) Inventors: Ryuji Kato, Ama-gun (JP); Hideo Ohira, Tajimi (JP); Noriatsu Aoi, Ichinomiya (JP); Tomoyo Hamajima, Nagoya (JP); Masaya Fujioka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 273 days.

(21) Appl. No.: 11/101,501

(22) Filed: Apr. 8, 2005

(65) Prior Publication Data

US 2005/0235871 A1    Oct. 27, 2005

(30) Foreign Application Priority Data

Apr. 26, 2004  (JP) ............................. 2004-130310

(51) Int. Cl.
*C09D 11/02* (2006.01)

(52) U.S. Cl. .................................. 106/31.86

(58) Field of Classification Search .............. 106/31.86
See application file for complete search history.

(56) References Cited

U.S. PATENT DOCUMENTS

| | | | |
|---|---|---|---|
| 5,016,028 A | 5/1991 | Temple | |
| 5,609,671 A | 3/1997 | Nagasawa | |
| 5,837,045 A | 11/1998 | Johnson et al. | |
| 2003/0010253 A1 | 1/2003 | Oki et al. | |
| 2003/0079652 A1 | 5/2003 | Choy | |
| 2003/0112305 A1 | 6/2003 | Kato et al. | |
| 2005/0275701 A1* | 12/2005 | Aoi et al. | .................... 347/100 |

FOREIGN PATENT DOCUMENTS

| | | |
|---|---|---|
| EP | 1 308 491 A2 | 5/2003 |
| JP | A 2-150355 | 6/1990 |
| JP | A 8-3498 | 1/1996 |
| JP | A 8-283631 | 10/1996 |
| JP | A 2000-513396 | 10/2002 |
| WO | WO 97/48769 | 12/1997 |

* cited by examiner

*Primary Examiner*—J. A. Lorengo
*Assistant Examiner*—Veronica Faison-Gee
(74) *Attorney, Agent, or Firm*—Oliff & Berridge, PLC

(57) ABSTRACT

A water base pigment ink for ink-jet recording contains a pigment, a propylene glycol derivative which has a saturation vapor pressure of 2 to 10 hPa and an octanol-water distribution coefficient log P of 0 to 1.35, and dipropylene glycol-n-propyl ether. The propylene glycol derivative is contained in the ink by 0.25 to 1.5% by weight, and the dipropylene glycol-n-propyl ether is contained in the ink by 0.5 to 1% by weight. The ink is excellent in the paper surface drying performance. Further, it is possible to avoid the occurrence of the feathering and the blank stripes in letters.

11 Claims, No Drawings

WATER BASE PIGMENT INK FOR INK-JET RECORDING, INK CARTRIDGE ACCOMMODATING THE SAME, AND INK-JET RECORDING METHOD

BACKGROUND OF THE INVENTION

1. Field of the Invention

The present invention relates to a water base pigment ink for ink-jet recording which is excellent in the drying performance on the paper surface and which makes it possible to avoid the occurrence of the feathering and the blank stripes in letters, an ink cartridge which accommodates the same, and an ink-jet recording method.

2. Description of the Related Art

In the ink-jet recording system, ink droplets are formed by the ink discharge system including, for example, the electrostatic attraction system, the system in which mechanical vibration or displacement is applied to the ink by using a piezoelectric element, and the system in which bubbles are generated by heating the ink to utilize the pressure generated thereby. All or a part of the ink droplets are adhered to a recording objective material such as paper to perform the recording.

Those used as the ink for ink-jet recording employed for the ink-jet recording system as described above include those in which various water-soluble dyes or pigments are dissolved or dispersed in liquid media composed of water and other components. For example, it is required for the ink for ink-jet recording that neither precipitation nor coagulation is caused even when the ink is not used for a long period of time, the ink is not clogged up in the ink flow passage and at the tip of the head of the ink-jet printer, the printing quality is satisfactory, and the weather resistance is excellent.

The dye and the pigment are compared with each other as follows. The dye is unsatisfactory in the water resistance, because the dye is completely dissolved in the ink medium composed of water and the like. The dye is fairly inferior in the weather resistance in view of the chemical structure thereof. On the contrary, the pigment is extremely satisfactory in the weather resistance including the water resistance, because the pigment is not dissolved but dispersed in the ink medium. In particular, the pigment ink is easily solidified after the evaporation of water. Once the pigment ink is solidified on the paper surface, the strong bond is formed between the pigment and the paper. Therefore, the pigment ink is more excellent in the securing performance on the paper than the dye ink. This function is further facilitated when the resin is contained as the dispersing agent or the binder in the pigment ink. Therefore, in recent years, the ink for ink-jet recording is being shifted from the dye ink to the pigment ink.

In recent years, it is demanded to use a pigment ink for ink-jet recording having a printing quality equivalent to that of a photographic image in which the contour of an image after the printing is sharp, and the blurring such as feathering and bleeding is suppressed as extremely as possible. For the purpose of realizing the printing quality as described above, the pigment ink for the ink-jet printer is added with a water-soluble organic solvent called "permeating agent" in order to quickly permeate the ink into the printing paper and solve the problems of the feathering and the drying performance on the paper surface. Those known as the permeating agent include, for example, glycol-based n-butyl ethers such as diethylene glycol-n-butyl ether, triethylene glycol-n-butyl ether, propylene glycol-n-butyl ether, dipropylene glycol-n-butyl ether, and tripropylene glycol-n-butyl ether. For example, Japanese Patent Application Laid-open No. 8-283631 discloses an ink for ink-jet recording containing, for example, propylene glycol mono butyl ether and dipropylene glycol mono butyl ether. The feathering refers to such a phenomenon that the ink is permeated along paper fibers existing irregularly which results in a shaggy and indistinct image when the printing is performed, for example, on the regular paper having the surface which is not subjected to the coating.

However, the permeating agent, which has been hitherto used, has the too large permeability into the paper. Therefore, in order to realize the printing quality approximately equivalent to that of the laser printer in which the feathering is caused extremely scarcely, it is necessary that the permeability into the paper is suppressed by decreasing the amount of addition of the permeating agent. If the amount of addition of the permeating agent is decreased, a problem has arisen such that the drying performance on the paper surface is deteriorated, and it is impossible to obtain any sufficient paper surface drying performance. Further, if the amount of addition of the permeating agent is decreased, the permeability into the paper is lowered. For this reason, a problem has arisen such that blank or white stripes in letter portions appear after the printing. Therefore, an ink has been demanded, in which the feathering and the blank stripes in letters do not occur while securing the excellent paper surface drying performance.

SUMMARY OF THE INVENTION

The present invention has been made in order to solve the problems as described above, an object of which is to provide a water base pigment ink for ink-jet recording which is excellent in the drying performance on the paper surface and which makes it possible to avoid the occurrence of the feathering and the blank stripes in letters, and an ink cartridge which accommodates the same.

According to the present invention, there is provided a water base pigment ink for ink-jet recording comprising:

a pigment;

a propylene glycol derivative which has a saturation vapor pressure of 2 to 10 hPa and an octanol-water distribution coefficient log P of 0 to 1.35; and dipropylene glycol-n-propyl ether, wherein:

the propylene glycol derivative is contained in the ink by 0.25 to 1.5% by weight, and the dipropylene glycol-n-propyl ether is contained in the ink by 0.5 to 1% by weight.

The inventors have succeeded in obtaining the water base pigment ink for ink-jet recording which is not only excellent in the paper surface drying performance but also involves no occurrence of the feathering and the blank stripes in letter portions by using the propylene glycol derivative which has the specified saturation vapor pressure and the specified octanol-water distribution coefficient log P and the dipropylene glycol-n-propyl ether in combination in the ink. That is, this success resides in the fact that only the strictly selected combination of the propylene glycol derivative having the specified physical properties and the dipropylene glycol-n-propyl ether simultaneously satisfies both of the permeating performance and the drying performance.

According to the present invention, there is also provided an ink cartridge which accommodates the ink of the present invention. The ink cartridge may be of the type capable of being detachably attached to an ink head, or the type capable of being detachably attached to a frame of an ink-jet printer.

In the case of the latter, the ink is supplied from the ink cartridge to a printing head via a flexible ink tube.

DESCRIPTION OF THE PREFERRED EMBODIMENTS

The water base pigment ink for ink-jet recording of the present invention contains the propylene glycol derivative. The propylene glycol derivative has the branched structure in the principal chain. The branched portion acts as a steric hindrance, and thus the propylene glycol derivative is hardly hydrated in the ink. Accordingly, the force of hydrogen bond is small as compared with ethylenic glycol derivatives. As a result, the hydrophobicity is somewhat strengthened. When the propylene glycol derivative is added to the ink, the saturation vapor pressure is increased. The propylene glycol derivative has the oxygen atom and the branched structure in the principal chain, in which the hydrophobic portion and the hydrophilic portion are not localized in the molecule, and the balance between the hydrophobicity and the hydrophilicity is satisfactory. Therefore, it is possible to avoid the occurrence of the feathering, and it is possible to provide the permeability to some extent.

The propylene glycol derivative has the saturation vapor pressure of 2 to 10 hPa. If the saturation vapor pressure is less than 2 hPa, then the ink is hardly dried after the printing, and the drying performance on the paper surface is deteriorated. If the saturation vapor pressure exceeds 10 hPa, the drying performance is too enhanced. Therefore, the ink is clogged up at the nozzle surface of the ink-jet head in some cases, and the odor inherent in the organic solvent is strengthened in other cases.

In addition, the propylene glycol derivative has the octanol-water distribution coefficient log P of 0 to 1.35. The octanol-water distribution coefficient log P is determined in accordance with the following expression (1) from the inorganic value (IV) and the organic value (OV) of the substance. The inorganic value and the organic value are values calculated on the assumption that the inorganic value of the hydroxyl group is 100 and the organic value of one carbon atom is 20. The inorganic value and the organic value of the substance can be determined by totalizing inorganic values and organic values of atoms and substituents contained in the molecule respectively. The inorganic value and the organic values serve as indexes to represent the hydrophilicity or the hydrophobicity. Therefore, the octanol-water distribution coefficient log P, which is determined from the inorganic value and the organic value, also serves as a value to represent the balance between the hydrophilicity and the hydrophobicity. Therefore, as the octanol-water distribution coefficient is larger, the hydrophobicity becomes stronger. As the octanol-water distribution coefficient is smaller, the hydrophilicity becomes stronger.

$$\log P = 0.0139 \times OV - 0.0045 \times IV \quad (1)$$

The propylene glycol derivative is relatively high in the hydrophilicity, because the octanol-water distribution coefficient log P is within the range as described above. Usually, a substance such as a size or the like, which has high hydrophobicity, is added to the printing paper to be used for the printing. Therefore, the ink having higher hydrophilicity is hardly adapted to the paper, with which the permeability is lowered. Therefore, when the ink, which contains the propylene glycol derivative having the octanol-water distribution coefficient log P adjusted to be within the range as described above, is used, it is possible to suppress the occurrence of the feathering. On the other hand, if the octanol-water distribution coefficient log P is less than 0, then the hydrophilicity is too high, and the permeability into the paper is deteriorated. Therefore, the blurring is not sufficient enough for neatly fulfilling the dot matrices of letter portions. As a result, blank or white stripes are formed in some cases, and the paper surface drying performance is deteriorated in other cases. If the octanol-water distribution coefficient log P exceeds 1.35, then the hydrophobicity is too high, and the ink and the paper are excessively adapted to one another. Therefore, the permeability into the paper is excessively increased, and the feathering occurs. More preferably, the octanol-water distribution coefficient log P is 0.5 to 1.35.

The propylene glycol derivative, in which the saturation vapor pressure is 2 to 10 hPa and the octanol-water distribution coefficient log P is 0 to 1.35, is not specifically limited. The propylene glycol derivative may include, for example, propylene glycol methyl ether, propylene glycol ethyl ether, propylene glycol-n-propyl ether, and propylene glycol methyl ether acetate.

The content of the propylene glycol derivative with respect to the total amount of the water base pigment ink for ink-jet recording of the present invention is 0.25 to 1.5% by weight. If the content is less than 0.25% by weight, it is feared that the paper surface drying performance may be deteriorated, and blank stripes may appear at recorded portions after the printing. If the content exceeds 1.5% by weight, the feathering tends to occur. The inventors have found out the fact that when the content of the propylene glycol derivative is within the range as described above provided that the other requirements of the present invention are satisfied, then the paper surface drying performance is excellent, and it is possible to avoid the occurrence of the feathering and the blank stripes in letters. The content of the propylene glycol derivative is preferably 0.30 to 1.5% by weight, and more preferably 0.5 to 1.5% by weight.

The water base pigment ink for ink-jet recording of the present invention contains the dipropylene glycol-n-propyl ether. The dipropylene glycol-n-propyl ether has the principal chain which has the propylene structure, and it further has the principal chain longer than that of the propylene glycol derivative. Therefore, the dipropylene glycol-n-propyl ether has the octanol-water distribution coefficient log P of 1.87, in which the hydrophobicity is high. For this reason, the ink, which contains the dipropylene glycol-n-propyl ether, has the satisfactory permeability into the paper. Therefore, the paper surface drying performance is excellent, and it is possible to avoid the occurrence of blank stripes in letters, owing to the combination with the propylene glycol derivative as described above.

The content of the dipropylene glycol-n-propyl ether with respect to the total amount of the water base pigment ink for ink-jet recording of the present invention is 0.5 to 1% by weight. If the content is less than 0.5% by weight, it is feared that the paper surface drying performance may be deteriorated, and blank stripes may appear at recorded portions after the printing. If the content exceeds 1% by weight, it is feared that the feathering may occur. Preferably, the content is 0.8 to 1% by weight.

The water base pigment ink for ink-jet recording of the present invention contains the pigment. It is preferable that the pigment is a self-dispersing pigment capable of effecting the stable dispersion even without any dispersing agent. The self-dispersing pigment is capable of being dispersed in water without any dispersing agent owing to the hydrophilic functional group such as carboxyl group, carbonyl group, hydroxyl group, and sulfone group and/or the salt thereof introduced into the surface of pigment particles by the chemical bond directly or via any polyvalent group.

The self-dispersing pigment is not especially limited. Those usable may include, for example, self-dispersing pigments subjected to the surface treatment by a method described, for example, in U.S. Pat. No. 5,609,671 corresponding to Japanese Patent Application Laid-open No. 8-3498 and U.S. Pat. No. 5,837,045 corresponding to Published Japanese Translation of PCT International Publication for Patent Application No. 2000-513396. Those commercially available may include, for example, CAB-O-JET 200, CAB-O-JET 300 (produced by Cabot), Bonjet CW1 (produced by Orient Chemical Industries, Ltd.), and LIOJET WD BLACK 002C (produced by Toyo Ink Mfg. Co., Ltd.).

The pigment, which is usable for the self-dispersing pigment described above, is not especially limited. It is possible to use any one of inorganic pigments and organic pigments. The pigment, which is suitable for performing the surface treatment as described above, may include, for example, carbon blacks such as MA8, MA100 (both produced by Mitsubishi Chemical Corporation), and Color Black FW200 (produced by Degussa).

The content of the self-dispersing pigment is determined depending on the desired color and the concentration. However, the content is preferably 1 to 15% by weight and more preferably 1 to 10% by weight with respect to the total amount of the water base pigment ink for ink-jet recording of the present invention.

The water base pigment ink for ink-jet recording of the present invention contains water. It is preferable to use deionized water as the water described above, rather than ordinary water containing various ions. The content of water is determined within a wide range depending on the type and the composition of the solvent components other than water and the desired characteristics of the ink. The content is preferably 10 to 95% by weight, more preferably 10 to 70% by weight, and much more preferably 20 to 70% by weight with respect to the total amount of the water base pigment ink for ink-jet recording of the present invention.

It is preferable that the water base pigment ink for ink-jet recording of the present invention contains a water-soluble organic solvent in addition to the propylene glycol derivative and the dipropylene glycol-n-propyl ether. When the above water-soluble organic solvent is contained as described above, it is possible to avoid the drying of the ink at the tip of the ink-jet head, enhance the printing density, and develop the vivid color.

It is preferable that a water-soluble glycol compound is contained as the water-soluble organic solvent. The water-soluble glycol compound acts as a moistening agent. It is possible to avoid, for example, the occurrence of the clog-up at the ink-jet head, the occurrence of the deposition caused by the evaporation of water from the ink, and the drying up of the ink. The water-soluble glycol compound is not especially limited, which may include, for example, glycerol, ethylene glycol, diethylene glycol, triethylene glycol, polyethylene glycol, propylene glycol, dipropylene glycol, tripropylene glycol, polypropylene glycol, 1,5-pentanediol, and 1,6-hexanediol.

When the water-soluble glycol compound is used as the water-soluble organic solvent, the content of the water-soluble glycol compound is preferably 5 to 50% by weight with respect to the total amount of the water base pigment ink for ink-jet recording of the present invention. If the content is less than 5% by weight, then the moistening action is insufficient, and problems arise, for example, such that the deposition and the drying up are caused in some cases. If the content exceeds 50% by weight, then the viscosity is unnecessarily increased to disable the jetting operation in some cases, and the ink is dried extremely slowly on the paper surface in other cases. The content is more preferably 10 to 40% by weight and much more preferably 15 to 35% by weight.

The water-soluble organic solvent other than the water-soluble glycol compound may include, for example, amides such as dimethylformamide and dimethylacetamide; ketones or ketone alcohols such as acetone and diacetone alcohol; ethers such as tetrahydrofuran and dioxane; glycerol; 2-pyrrolidone; N-methyl-2-pyrrolidone; and 1,3-dimethyl-2-imidazolidinone. The water-soluble organic solvent as described above may be used singly. Alternatively, two or more of the water-soluble organic solvents may be used in combination.

The water base pigment ink for ink-jet recording of the present invention is basically constructed as described above. However, it is also allowable to further contain, for example, conventionally known surfactants, viscosity-adjusting agents, surface tension-adjusting agents, pH-adjusting agents, metal rust-preventive agents, specific resistance-adjusting agents, film-forming agents, ultraviolet-absorbing agents, antioxidizing agents, antifading agents, and antiseptic/fungicidal agents depending on the purpose to improve other various performance including, for example, the discharge stability, the adaptability with respect to materials for the head and the ink cartridge, the storage stability, the image storage performance and the like. When the water base pigment ink for ink-jet recording of the present invention is applied to the ink-jet system in which the jetting operation is performed in accordance with the action of thermal energy, it is also allowable to adjust thermal physical values including, for example, the specific heat, the coefficient of thermal expansion, and the coefficient of thermal conductivity. The ink-jet recording method, which is based on the use of the water base pigment ink for ink-jet recording of the present invention, is also one aspect of the present invention.

The problems involved in the conventional technique have been sufficiently solved by the present invention. When the propylene glycol derivative and the dipropylene glycol-n-propyl ether, which satisfy the requirements as described above, are contained, it is possible to realize the water base pigment ink for ink-jet recording and the ink-jet recording method in which the paper surface drying performance is excellent, and it is possible to avoid the occurrence of the feathering and the blank stripes in letters.

The present invention will be explained in further detail below as exemplified by Examples. However, the present invention is not limited to only Examples.

EXAMPLE 1

40 parts by weight of water, 25.5 parts by weight of glycerol, 0.5 part by weight of propylene glycol-n-propyl ether (PGPE), and 1 part by weight of dipropylene glycol-n-propyl ether (DPGPE) were mixed while performing agitation to prepare 67 parts by weight of an ink solvent. Subsequently, 67 parts by weight of the prepared ink solvent were gradually added while agitating 33 parts by weight of CAB-O-JET 300 (carbon black concentration: 15%, produced by Cabot). Agitation was performed for 30 minutes, followed by being filtrated through a membrane filter having a pore size of 1 μm to prepare an ink.

EXAMPLE 2

40 parts by weight of water, 25.7 parts by weight of glycerol, 0.5 part by weight of PGPE, and 0.8 part by weight of DPGPE were mixed while performing agitation to prepare 67 parts by weight of an ink solvent. Subsequently, 67 parts by weight of the prepared ink solvent were gradually added while agitating 33 parts by weight of CAB-O-JET 300 (carbon black concentration: 15%, produced by Cabot). Agitation was performed for 30 minutes, followed by being filtrated through a membrane filter having a pore size of 1 µm to prepare an ink.

EXAMPLE 3

39 parts by weight of water, 26.2 parts by weight of glycerol, 1 part by weight of PGPE, and 0.8 part by weight of DPGPE were mixed while performing agitation to prepare 67 parts by weight of an ink solvent. Subsequently, 67 parts by weight of the prepared ink solvent were gradually added while agitating 33 parts by weight of Bonjet CW1 (carbon black concentration: 15%, produced by Orient Chemical Industries, Ltd.). Agitation was performed for 30 minutes, followed by being filtrated through a membrane filter having a pore size of 1 µm to prepare an ink.

EXAMPLE 4

49 parts by weight of water, 24 parts by weight of glycerol, 1 part by weight of PGPE, and 1 part by weight of DPGPE were mixed while performing agitation to prepare 75 parts by weight of an ink solvent. Subsequently, 75 parts by weight of the prepared ink solvent were gradually added while agitating 25 parts by weight of LIOJET WD BLACK 002C (carbon black concentration: 20%, produced by Toyo Ink Mfg. Co., Ltd.). Agitation was performed for 30 minutes, followed by being filtrated through a membrane filter having a pore size of 1 µm to prepare an ink.

EXAMPLE 5

40 parts by weight of water, 25.5 parts by weight of glycerol, 1 part by weight of PGPE, and 0.5 part by weight of DPGPE were mixed while performing agitation to prepare 67 parts by weight of an ink solvent. Subsequently, 67 parts by weight of the prepared ink solvent were gradually added while agitating 33 parts by weight of CAB-O-JET 300 (carbon black concentration: 15%, produced by Cabot). Agitation was performed for 30 minutes, followed by being filtrated through a membrane filter having a pore size of 1 µm to prepare an ink.

EXAMPLE 6

40 parts by weight of water, 25 parts by weight of glycerol, 1.5 parts by weight of propylene glycol methyl ether (PGME), and 0.5 part by weight of DPGPE were mixed while performing agitation to prepare 67 parts by weight of an ink solvent. Subsequently, 67 parts by weight of the prepared ink solvent were gradually added while agitating 33 parts by weight of CAB-O-JET 300 (carbon black concentration: 15%, produced by Cabot). Agitation was performed for 30 minutes, followed by being filtrated through a membrane filter having a pore size of 1 µm to prepare an ink.

EXAMPLE 7

39 parts by weight of water, 25.7 parts by weight of glycerol, 1.5 parts by weight of PGME, and 0.8 part by weight of DPGPE were mixed while performing agitation to prepare 67 parts by weight of an ink solvent. Subsequently, 67 parts by weight of the prepared ink solvent were gradually added while agitating 33 parts by weight of Bonjet CW1 (carbon black concentration: 15%, produced by Orient Chemical Industries, Ltd.). Agitation was performed for 30 minutes, followed by being filtrated through a membrane filter having a pore size of 1 µm to prepare an ink.

EXAMPLE 8

40 parts by weight of water, 26 parts by weight of glycerol, 0.5 part by weight of propylene glycol ethyl ether (PGEE), and 0.5 part by weight of DPGPE were mixed while performing agitation to prepare 67 parts by weight of an ink solvent. Subsequently, 67 parts by weight of the prepared ink solvent were gradually added while agitating 33 parts by weight of CAB-O-JET 300 (carbon black concentration: 15%, produced by Cabot). Agitation was performed for 30 minutes, followed by being filtrated through a membrane filter having a pore size of 1 µm to prepare an ink.

EXAMPLE 9

40 parts by weight of water, 24.5 parts by weight of glycerol, 1.5 parts by weight of propylene glycol methyl ether acetate (PGMEA), and 1 part by weight of DPGPE were mixed while performing agitation to prepare 67 parts by weight of an ink solvent. Subsequently, 67 parts by weight of the prepared ink solvent were gradually added while agitating 33 parts by weight of CAB-O-JET 300 (carbon black concentration: 15%, produced by Cabot). Agitation was performed for 30 minutes, followed by being filtrated through a membrane filter having a pore size of 1 µm to prepare an ink.

EXAMPLE 10

40 parts by weight of water, 25.7 parts by weight of glycerol, 0.3 part by weight of PGPE, and 1 part by weight of DPGPE were mixed while performing agitation to prepare 67 parts by weight of an ink solvent. Subsequently, 67 parts by weight of the prepared ink solvent were gradually added while agitating 33 parts by weight of CAB-O-JET 300 (carbon black concentration: 15%, produced by Cabot). Agitation was performed for 30 minutes, followed by being filtrated through a membrane filter having a pore size of 1 µm to prepare an ink.

COMPARATIVE EXAMPLES 1 to 16

Inks were prepared in the same manner as in Example 1 in accordance with compositions shown in Table 2 by using CAB-O-JET 300, Bonjet CW1, or LIOJET WD BLACK 002C as the pigment dispersion material and using PGPE, PGME, PGEE, or PGMEA as the propylene glycol derivative, or propylene glycol-n-butyl ether (PGBE) or tripropylene glycol methyl ether (TPGME) as the permeating agent having been hitherto used.

Table 1 shows the abbreviations, the octanol-water distribution coefficients log P, and the saturation vapor pressures of the propylene glycol derivatives, propylene glycoln-butyl ether, tripropylene glycol methyl ether, and dipropylene glycol-n-propyl ether used in Examples and Comparative Examples. Table 2 shows the ink compositions of Examples and Comparative Examples.

TABLE 1

| Name | Abbreviation | log P | Saturation vapor pressure (hPa) |
|---|---|---|---|
| Propylene glycol methyl ether | PGME | 0.57 | 8.71 |
| Propylene glycol ethyl ether | PGEE | 0.85 | 9.4 |
| Propylene glycol-n-propyl ether | PGPE | 1.13 | 2.21 |
| Propylene glycol methyl eether acetate | PGMEA | 1.31 | 5 |
| Propylene glycol-n-butyl ether | PGBE | 1.41 | 0.78 |
| Tripropylene glycol methyl ether | TPGME | 2.06 | 0.04 |
| Dipropylene glycol-n-propyl ether | DPGPE | 1.87 | 0.03 |

Examples 1 to 10 and Comparative Examples 1 to 16, and the evaluation was made in accordance with the following criteria.

++: the feathering is scarcely observed;
±: the feathering is inconspicuous;
+: the feathering is conspicuous, and the sample involves any practical problem; and
−: the feathering is clearly conspicuous, and the sample is unsuitable for any practical use.

(2) Paper Surface Drying Performance

Each of the recording samples prepared in Examples 1-10 and Comparative Examples 1-16 was rubbed with a finger 15 seconds after the printing. The rubbing-off of the ink was visually observed, and the influence exerted on the image was evaluated in accordance with the following criteria. The paper surface drying performance refers to the drying performance of the ink on the paper surface after the printing.

++: the rubbing-off of the ink is scarcely observed;

TABLE 2

| | Pigment dispersion | | Permeating agent | | DPGPE | Glycerol | Water |
|---|---|---|---|---|---|---|---|
| | Name | Parts by weight | Name | Parts by weight | (parts by weight) | (parts by weight) | (parts by weight) |
| Example 1 | CAB-O-JET 300 | 33 | PGPE | 0.5 | 1 | 25.5 | 40 |
| Example 2 | CAB-O-JET 300 | 33 | PGPE | 0.5 | 0.8 | 25.7 | 40 |
| Example 3 | Bonjet CW1 | 33 | PGPE | 1 | 0.8 | 26.2 | 39 |
| Example 4 | LIOJET WD BLACK 002C | 25 | PGPE | 1 | 1 | 24 | 49 |
| Example 5 | CAB-O-JET 300 | 33 | PGPE | 1 | 0.5 | 25.5 | 40 |
| Example 6 | CAB-O-JET 300 | 33 | PGME | 1.5 | 0.5 | 25 | 40 |
| Example 7 | Bonjet CW1 | 33 | PGME | 1.5 | 0.8 | 25.7 | 39 |
| Example 8 | CAB-O-JET 300 | 33 | PGEE | 0.5 | 0.5 | 26 | 40 |
| Example 9 | CAB-O-JET 300 | 33 | PGMEA | 1.5 | 1 | 24.5 | 40 |
| Example 10 | CAB-O-JET 300 | 33 | PGPE | 0.3 | 1 | 25.7 | 40 |
| Comp. Ex. 1 | CAB-O-JET 300 | 33 | PGMEA | 2 | 0.3 | 24.7 | 40 |
| Comp. Ex. 2 | Bonjet CW1 | 33 | PGPE | 2 | 0.3 | 25.7 | 39 |
| Comp. Ex. 3 | CAB-O-JET 300 | 33 | PGPE | 1 | 0.3 | 25.7 | 40 |
| Comp. Ex. 4 | LIOJET WD BLACK 002C | 25 | PGEE | 2 | 0.3 | 23.7 | 49 |
| Comp. Ex. 5 | CAB-O-JET 300 | 33 | PGME | 2 | 0.3 | 24.7 | 40 |
| Comp. Ex. 6 | CAB-O-JET 300 | 33 | PGMEA | 2 | 0 | 25 | 40 |
| Comp. Ex. 7 | CAB-O-JET 300 | 33 | PGPE | 2 | 0 | 25 | 40 |
| Comp. Ex. 8 | CAB-O-JET 300 | 33 | PGME | 2 | 0 | 25 | 40 |
| Comp. Ex. 9 | CAB-O-JET 300 | 33 | none | 0 | 1 | 26 | 40 |
| Comp. Ex. 10 | Bonjet CW1 | 33 | PGME | 4 | 0 | 24 | 39 |
| Comp. Ex. 11 | LIOJET WD BLACK 002C | 25 | PGPE | 3 | 0 | 23 | 49 |
| Comp. Ex. 12 | CAB-O-JET 300 | 33 | PGPE | 1 | 1.2 | 24.8 | 40 |
| Comp. Ex. 13 | CAB-O-JET 300 | 33 | PGPE | 0.2 | 0.8 | 26 | 40 |
| Comp. Ex. 14 | CAB-O-JET 300 | 33 | PGBE | 2 | 0.3 | 24.7 | 40 |
| Comp. Ex. 15 | CAB-O-JET 300 | 33 | PGBE | 0.5 | 0.5 | 26 | 40 |
| Comp. Ex. 16 | CAB-O-JET 300 | 33 | TPGME | 1 | 1 | 25 | 40 |

All pigment concentrations are 5% by weight in respective inks of Examples and Comparative Example. Ion exchange water was used for water.

EVALUATION

Evaluation was made in accordance with the following method for the inks prepared in Examples 1 to 10 and Comparative Examples 1 to 16. Recording samples, which were recorded on DATA COPY paper (produced by m-real) by using an ink-jet recording apparatus having a shearing mode type ink-jet head as disclosed in U.S. Pat. No. 5,016,028 corresponding to Japanese Patent Application Laid-open No. 2-150355, were used for the evaluation. Obtained results are shown in Table 3.

(1) Feathering

The feathering was visually observed in relation to the recording samples based on the use of the inks prepared in +: the rubbing-off of the ink is inconspicuous;
±: the rubbing-off of the ink is conspicuous, and the sample involves any practical problem; and
−: the rubbing-off of the ink is clearly conspicuous, and the sample is unsuitable for any practical use.

(3) Blank Stripes in Letters

The occurrence of blank stripes was visually observed for letter portions after the printing in relation to the recording samples based on the use of the inks prepared in Examples 1 to 10 and Comparative Examples 1 to 16. The blank stripes in letters refer to gaps generated when the printing is performed with an ink having no sufficient permeability.

++: the blank stripes in letters are scarcely observed;
+: the blank stripes in letters are inconspicuous;

±: the blank stripes in letters are conspicuous, and the sample involves any practical problem; and −: the blank stripes in letters are clearly conspicuous, and the sample is unsuitable for any practical use.

TABLE 3

|  | Feathering | Paper surface drying performance | Blank stripes in letters |
|---|---|---|---|
| Example 1 | + | ++ | ++ |
| Example 2 | ++ | ++ | ++ |
| Example 3 | ++ | ++ | ++ |
| Example 4 | + | ++ | ++ |
| Example 5 | ++ | + | + |
| Example 6 | ++ | + | + |
| Example 7 | ++ | ++ | ++ |
| Example 8 | ++ | + | + |
| Example 9 | + | ++ | ++ |
| Example 10 | + | + | ++ |
| Comp. Ex. 1 | ++ | ± | + |
| Comp. Ex. 2 | ± | ± | + |
| Comp. Ex. 3 | ++ | ± | ± |
| Comp. Ex. 4 | ± | ± | + |
| Comp. Ex. 5 | ++ | ± | ± |
| Comp. Ex. 6 | ++ | − | − |
| Comp. Ex. 7 | + | − | ± |
| Comp. Ex. 8 | ++ | − | − |
| Comp. Ex. 9 | + | ± | ± |
| Comp. Ex. 10 | ++ | − | − |
| Comp. Ex. 11 | ± | + | + |
| Comp. Ex. 12 | ± | ++ | ++ |
| Comp. Ex. 13 | ++ | ± | + |
| Comp. Ex. 14 | − | ++ | ++ |
| Comp. Ex. 15 | − | ± | ± |
| Comp. Ex. 16 | − | + | + |

As clarified from Table 3, the inks prepared in Examples 1 to 10 provided the satisfactory results in relation to all of the items of the feathering, the paper surface drying performance, and the blank stripes in letters. On the contrary, the inks prepared in Comparative Examples 1 to 13 involved problems in relation to at least one of the items of the feathering, the paper surface drying performance, and the blank stripes in letters, probably for the following reason. That is, it is considered that the contents of the propylene glycol derivative and the dipropylene glycol-n-propyl ether are not appropriate in the inks prepared in Comparative Examples 1 to 13 as compared with the inks prepared in Examples. The inks prepared in Comparative Examples 14 to 16 contain the propylene glycol-n-butyl ether (PGBE) or the tripropylene glycol methyl ether (TPGME) in which the saturation vapor pressure is less than 2 hPa, and the octanol-water distribution coefficient log P exceeds 1.35. Therefore, the inks prepared in Comparative Examples 14 to 16 involved problems in relation to at least one of the items of the feathering, the paper surface drying performance, and the blank stripes in letters.

The present invention is constructed as described above. Therefore, it is possible to provide the water base pigment ink for ink-jet recording, the ink cartridge accommodating the same, and the ink-jet recording method in which the paper surface drying performance is excellent and it is possible to avoid the occurrence of the feathering and the blank stripes in letters.

What is claimed is:

1. A water base pigment ink for ink-jet recording comprising:
   a pigment;
   a propylene glycol derivative which has a saturation vapor pressure of 2 to 10 hPa and an octanol-water distribution coefficient log P of 0 to 1.35; and
   dipropylene glycol-n-propyl ether, wherein:
   the propylene glycol derivative is contained in the ink by 0.25 to 1.5% by weight, and the dipropylene glycol-n-propyl ether is contained in the ink by 0.5 to 1% by weight.

2. The water base pigment ink for ink-jet recording according to claim 1, wherein the dipropylene glycol-n-propyl ether has a content of 0.8 to 1% by weight.

3. The water base pigment ink for ink-jet recording according to claim 1, wherein the propylene glycol derivative has a content of 0.3 to 1.5% by weight.

4. The water base pigment ink for ink-jet recording according to claim 1, wherein the propylene glycol derivative has a content of 0.5 to 1.5% by weight.

5. The water base pigment ink for ink-jet recording according to claim 1, wherein the pigment is a self-dispersing pigment.

6. The water base pigment ink for ink-jet recording according to claim 1, wherein the propylene glycol derivative is at least one selected from the group consisting of propylene glycol methyl ether, propylene glycol ethyl ether, propylene glycol-n-propyl ether, and propylene glycol methyl ether acetate.

7. The water base pigment ink for ink-jet recording according to claim 6, wherein the propylene glycol derivative is propylene glycol-n-propyl ether.

8. The water base pigment ink for ink-jet recording according to claim 1, wherein the octanol-water distribution coefficient log P of the propylene glycol derivative is 0.5 to 1.35.

9. An ink cartridge which accommodates the water base pigment ink for ink-jet recording as defined in claim 1.

10. An ink-jet recording method comprising using the water base pigment ink for ink-jet recording as defined in claim 1.

11. A water base pigment ink for ink-jet recording comprising:
    a pigment;
    a propylene glycol derivative which has a saturation vapor pressure of 2 to 10 hPa and an octanol-water distribution coefficient log P of 0 to 1.35; and
    dipropylene glycol-n-propyl ether, wherein:
    the propylene glycol derivative is selected from the group consisting of propylene glycol methyl ether, propylene glycol ethyl ether, and propylene glycol methyl ether acetate, and is contained in the ink by 0.25 to 1.5% by weight, and the dipropylene glycol-n-propyl ether is contained in the ink by 0.5 to 1% by weight.

* * * * *